United States Patent [19]

Watanabe

[11] Patent Number: 4,797,543

[45] Date of Patent: Jan. 10, 1989

[54] SELECTABLE DATA READOUT IC CARD

[75] Inventor: Hiroshi Watanabe, Kokubunji, Japan

[73] Assignee: 501 Toppan Moore Company, Ltd., Tokyo, Japan

[21] Appl. No.: 892,099

[22] Filed: Jul. 30, 1986

[30] Foreign Application Priority Data

Jul. 31, 1985 [JP] Japan .................................. 60-169237

[51] Int. Cl.⁴ .............................................. G06K 5/00
[52] U.S. Cl. ...................................... 235/492; 235/494; 235/380; 250/569
[58] Field of Search ................ 235/492, 493, 494, 487, 235/380; 250/566, 569

[56] References Cited

U.S. PATENT DOCUMENTS

| 4,268,744 | 5/1981 | McGeary ........................ 235/493 X |
| 4,319,131 | 3/1982 | McGeary et al. ................... 235/493 |
| 4,575,621 | 3/1986 | Dreifus .............................. 235/380 |
| 4,680,459 | 7/1987 | Drexler .............................. 235/487 |

Primary Examiner—Philip H. Leung
Attorney, Agent, or Firm—Kenyon & Kenyon

[57] ABSTRACT

An IC card has at least a CPU and a memory unit having a plurality of storage areas allocated therein and can write or read information. The IC card includes an indication unit which indicates if the information written in the storage area is the information to be subjected to an updated information readout for reading only the latest information or the information to be subjected to a history information readout for reading the information written in the storage area, sequentially in a predetermined order. In accordance with an indication by the indication unit, a selective readout of the information in the storage area is possible between the updated information readout and the history information readout.

11 Claims, 10 Drawing Sheets

SELECTABLE DATA READOUT IC CARD

BACKGROUND OF THE INVENTION

The present invention relates to an integrated circuit (IC) card containing integrated circuits such as a microcomputer and a memory unit, and particularly, to an IC card provided with indication means for indicating history or curriculum information or updated information to thereby avoid wasteful recording of varying data, obtain a rapid access and enable a versatile application, and capable of not reading unnecessary information.

An IC card or so-called smart card is produced in various shapes, for example, there exist a flat card, a key-shaped card, and a rod-shaped card. The IC card of the present invention covers all of these cards.

An IC card contains elements such as a microprocessor (CPU) and a memory unit and hence is a smallsized information processing system having functions of decision and storage. Consequently, the data integrity and security can be further enhanced as compared with the conventional magnetic card such as a credit card or a bank card. Furthermore, since the storage capacity has been greatly increased through the advance of the IC technology, the IC card is regarded as efficient for the information storage card.

For the memory unit of an IC card, a nonvolatile IC memory such as an erasable, programmable read-only memory, EPROM in which stored data can be erased by ultraviolet radiation or an electrical, erasable, programmable read-only memory, EEPROM is used, and hence the storage contents can be kept therein without requiring a power source to be integrated in the card. Consequently, the memory unit can be produced in a simple structure and is thus adopted as the primary storage means of the IC card at present. However, a volatile IC memory such as a random access memory, RAM can also be used as the memory of the IC card if a long-life power supply such as a battery is built in the IC card to keep the contents thereof, or as means for temporarily saving storage contents therein from another memory without integrating a power supply in the card.

In the past, data is generally stored in the IC memory as follows. A storage area having an appropriate size is allocated in the IC memory, and then the information of data is sequentially written beginning from an end thereof.

The entire information thus stored is conventionally read out at a time; or various information items are respectively stored in a plurality of storage areas, and a desired information is read by specifying the storage area number associated with the infromation, thereby retrieving the information from each storage area.

Information stored in the memory of an IC card is subjected to renewal or change at times. However, once information is written in a certain storage area of a ROM used as a memory unit, erasing the writen information and re-writing data to be renewed or changed in that area are not possible. Therefore, information should be written one after another in the order of time sequence beginning from one end of the storage area. Consequently, to read a desired information from those written in such a manner, it is necessary to read the information sequentially in writing history until the desired information is read.

With the IC crd whose information is read in the units of storage area, it is necessary to read the entire contents of a storage area sequentially in time (or in the order of history) from the beginning even if only a portion of the information in the storage area, e.g., the latest information thereof, is required. Therefore, there arise some problems that it takes a substantial time to read the desired information and that unnecessary information is sequentially read until the desired information is read, which impedes data sequrity.

Apart from the above, it is desirable in some cases to read the written information sequentially in time depending upon the types or applications of the information. Thus, an IC card has been desired which is capable of both reading only the latest information quickly and reading the information sequentially in the order of history. In addition, in case where erroneous or incomplete information has been written or in case where particular past information is desired not to be read, these unnecessary information should not be read in case of one of the above two methods reading the information sequentially in the order of history since it takes a waste time for reading necessary information.

SUMMARY OF THE INVENTION

It is an object of the present invention to provide an IC card capable of selectively reading an updated information and reading a history information sequentially in time, and not reading unnecessary information in case of reading sequentially in the order of history.

To achieve the above object of the present invention, in an IC card containing an electronic circuit including at least a CPU and a memory unit constituted by a plurality of storage areas wherein an information can be sequentially recorded and read out therefrom, there are provided: indication means for selectively indicating either that said information recorded in a plurality of storage areas of the memory unit is an updated information or a history information, only a latest information being read from said updated information and the information being sequentially read in the order of history from said history information; updated information readout means for reading only the latest information among those written in a storage area when the information written in said storage area has been indicated as an updated information; and history information readout means for reading sequentially in a predetermined order the information stored in a storage area when the information stored in said storage area has been indicated as a history information.

In the storage area indicated as of an updated information, the updated information is not read sequentially starting from one end of the storage area as conventional, but the latest information only is accessed to be read. In the storage area not indicated as of an updated information, the information within a predetermined range is sequentially read for accomplishing the history information readout. The indication of the history information readout or the updated information readout may be performed with two methods: one is to selectively indicate by means of an indication input from the external and the other is to previously give information as to which readout is to beuused for each storage area.

According to the present invention, there is provided indication means for indicating that the information written in a plurality of storage areas is an updated information or a history information. Therefore, in case of the updated information readout requiring only the latest information, only the latest information can be accessed and read without reading the old information, thereby shortening the access time. Alternatively, in case of the history information readout, it is possible to read only the information within a predetermined range among those written to date. Thus, the access time becomes short, and the proper information can be quickly obtained, which is suitable for use in such as confirmation of information change in time, causes of change, or analysis of future tendency As above, for the updated information of which only the latest information is required to be read therefrom, an updated information readout is carried out. Alternatively, for the history information of which the information within a predetermined range among those written to date is required to be read therefrom, a history information readout is carried out by indicating the specific range of the storage area. Therefore, the information readout efficiency can be improved and the information processing can be made quickly, thus making good use of the IC card.

DESCRIPTION OF THE PREFERRED EMBODIMENTS

The embodiments of the present invention will be described with reference to the accompanying drawings.

Figure 1:
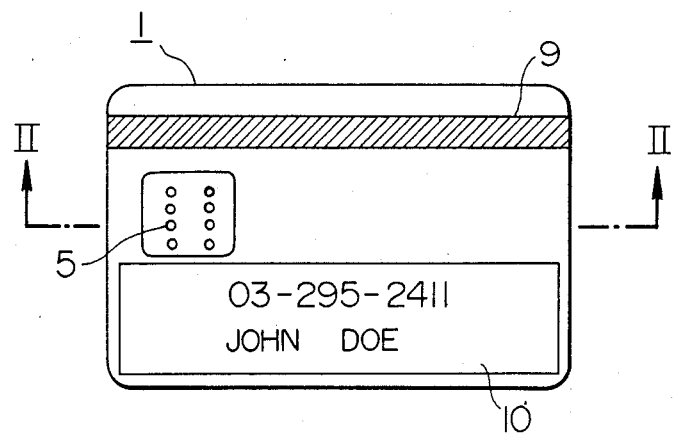
FIG. 1 is a plan view of an IC card.
Figure 2:
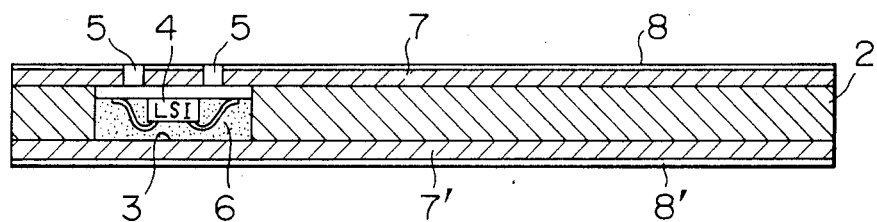
FIG. 2 is a cross sectional view along II—II line of FIG. 1.

FIG. 1 is a front view showing an appearance of an embodiment of an IC card according to the present invention, whereas FIG. 2 is a cross-sectional view illustrating an internal configuration of the IC card. The IC card 1 includes a card core 2 formed with a material, for example, plastics having a cavity 3 as a portion thereof, and an IC module 4 is housed in the cavity 3. The IC module 4 contains one or two large-scale integration (LSI) chips and is provided with eight connecting terminals 5, which are used to electrically connect external circuits to electronic circuits included in the IC module 4.

To protect the IC module 4, the cavity 3 is filled with a packing material 6, print layers 7, 7' are fixed onto the upper and lower surfaces of the card core 2, and graphic images, characters and the like are printed on the surfaces of the print layers in many cases. The print layers are covered with surface layers 8, 8' for protection thereof.

In FIG. 2, the thickness of the IC card 1 is particularly exaggerated, namely, in the actual card, the card core 2, the print layer, and the surface layer have thickness of 0.55 mm, 0.1 mm, and 0.2 mm, respectively and the entire thickness of the IC card is about 0.8 mm.

In this diagram, a magnetic stripe 9 and embossed characters 10 are to be added depending on the usage of the IC card, that is, these items are not indispensable for the IC card.

Figure 3:
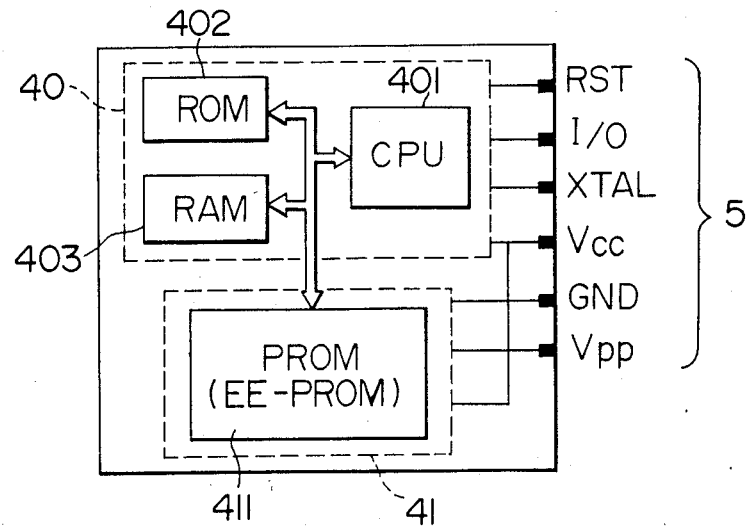
FIG. 3 is a block diagram showing the circuit arrangement of the IC card.

FIG. 3 is a block diagram showing the arrangement of ICs included in the IC module 4, wherein two-chip arrangement of a CPU chip 40 and a memory chip 41 is adopted. CPU 401 included in the CPU chip 40 controls programs, ROM 402 stores the programs, and RAM 403 serves to temporarily store data during the program steps. PROM included in the memory chip 41 mainly stores data. Of various types of PROMs, an EPROM using ultraviolet radiation for erasure (if used with the IC card, data erasure is possible only when a window for passing ultraviolet radiation is formed on the IC card), an EEPROM which can electrically erase data, or the like may be used.

If the memory chip 41 is not used and the IC card is constituted by a single chip IC module, the CPU chip 40 may include therein a CPU, ROM, RAM and the like.

Figure 4:
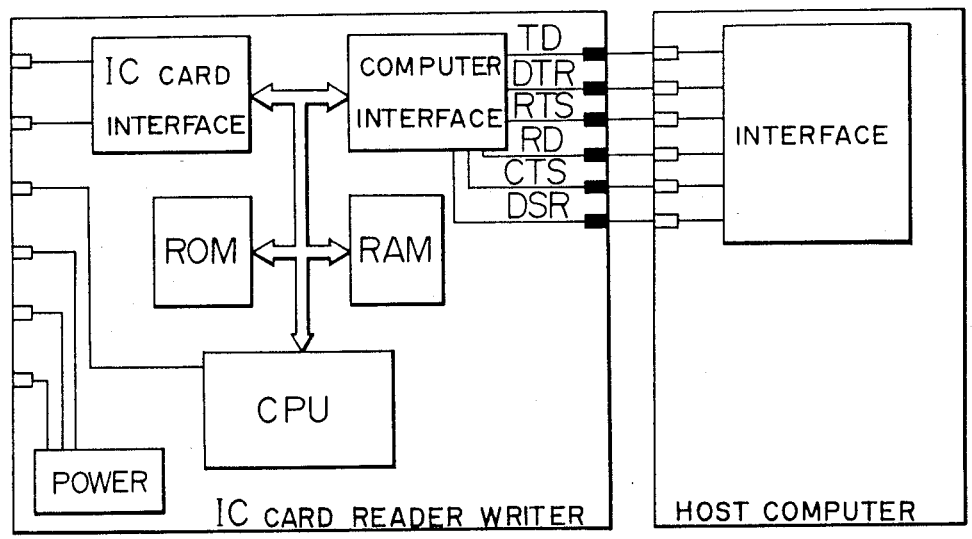
FIG. 4 shows the outline of an IC card reader/writer to be used by inserting the IC card therein and a host computer.

The IC card is used by connecting it to a host computer via an IC card reader/writer as shown in FIG. 4.

Figure 5:
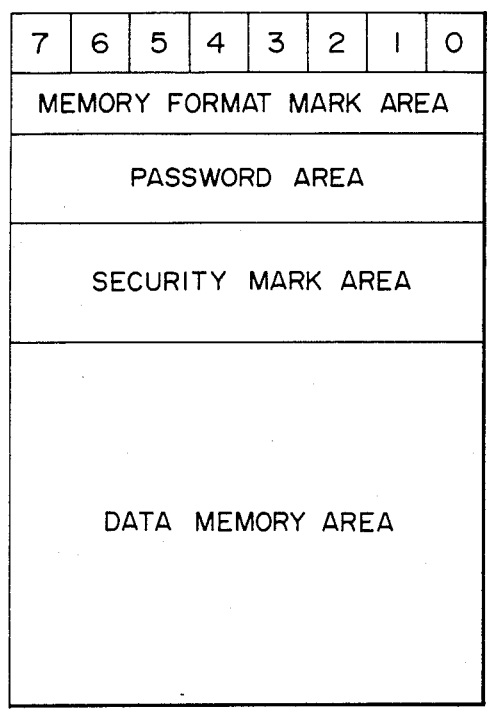
FIG. 5 shows the structure of the memory of the IC card.

FIG. 5 shows the structure of the memory according to an embodiment of the present invention, the memory including: a data memory area for storing data; a password area; a security mark area for storing erroneous password inputs; and a memory format mark area for indicating the presence of information in the memory.

Figure 6:
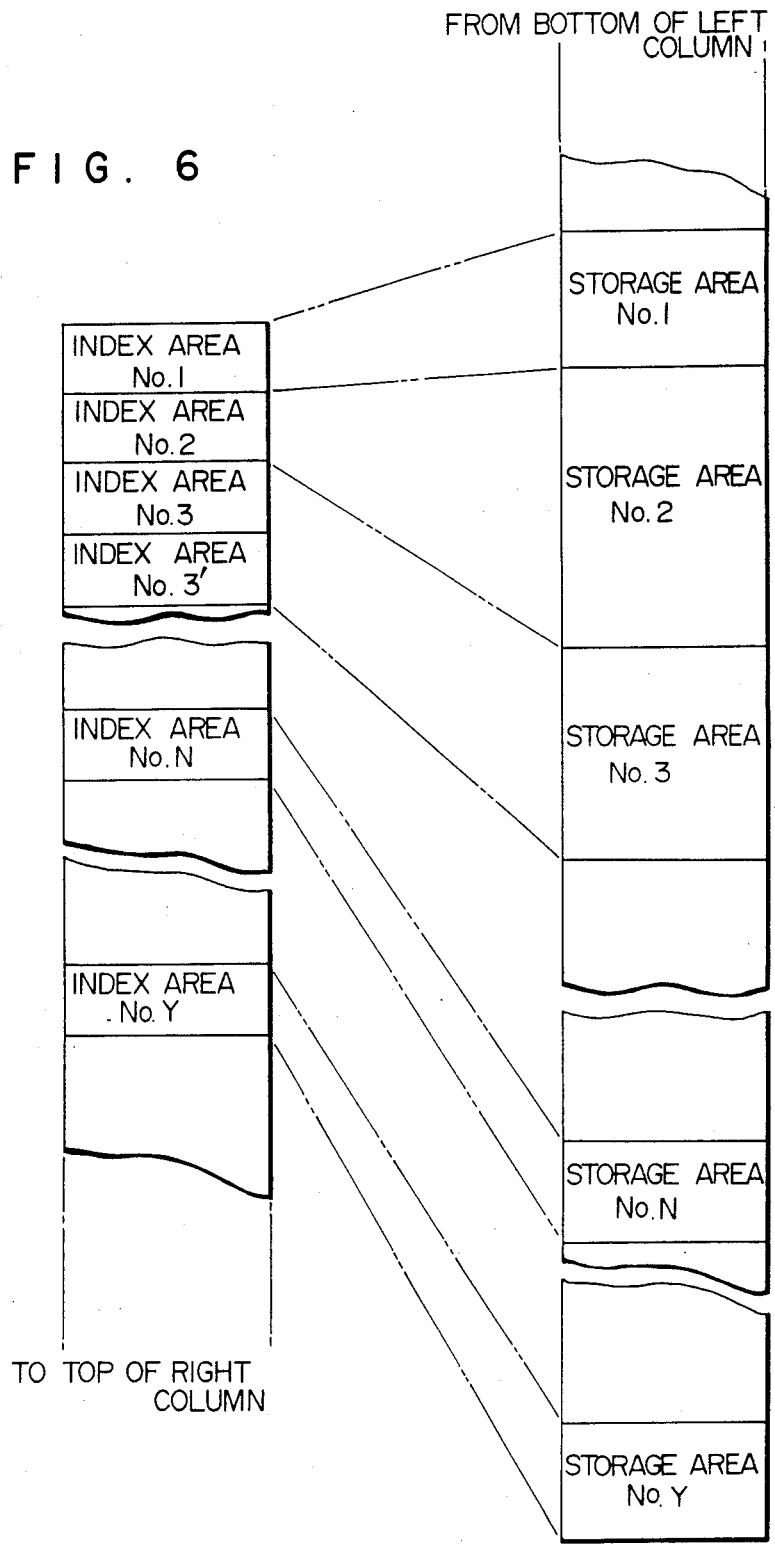
FIG. 6 shows the structure of the data memory area.

FIG. 6 shows the structure of the data memory area of FIG. 5 in more detail. The data memory area includes a plurality of storage areas starting from No. 1 to No. Y and a plurality of index areas starting from No. 1 to No. Y and corresponding to the respective storage areas. History information or updated information is sotred in respective specified storage areas depending on the predetermined items of necessary information. The index areas are provided in correspondence to the storage areas and used for access to the corresponding storage areas.

Figure 7:
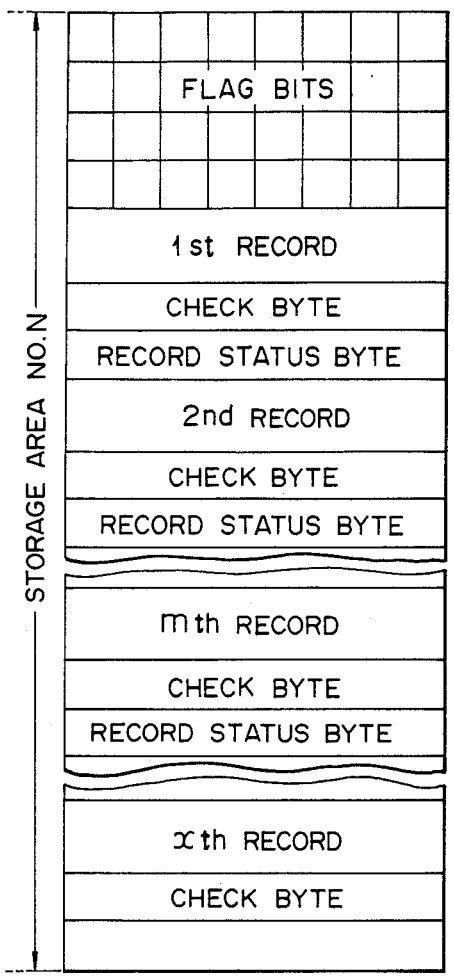
FIG. 7 shows the structure of the storage area.

FIG. 7 shows the structure of one (No. N) of the storage areas shown in FIG. 6 in more detail. In the storage area No. N, there are X records or unit record areas capable of storing information starting from a first storage to an N-th storage, and flag bits for storage of the number of records (unit storage areas) used for storage of the information. In addition, each record is added with a check byte for checking errors during reading written information and a record status byte. The record status byte constitutes a bit area for an identification mark which identifies an attribute (record status) of the information written on a record. For instance, if the information is erroneously written in the record, bits representative of disabling reading the information are written in the bit area.

Information is sequentially written starting from the first record. If the first record has already been used, the next latest information to be recorded is written in the second record. Thus, the m-th latest information is written in the m-th record. Simultaneously with storage of the information, a necessary information is written in the check byte. Writing in the record status byte is arbitrary. For instance, in case where incorrect information has been written in a certain record, written information has become unnecessary for some reason, or incomplete information has been written, bits (record status) are written in the record status byte for indicating that such information in the record is not permitted to be read.

The flag bits of a storage area have at least the same number as of the maximum number of records of the storage area. All of the bits are initially set at "1" and sequentially inverted to "0" one bit after another each time new information is written in each record. Management of the number of inverted bits enables a check of the numbers of used and unused records for storage of the latest information.

In the example of FIG. 7, although the flag bits are allocated in each storage area at the top address thereof, they may be allocated separately in the records by substituting them by respective one bits of the record status bytes.

Figure 8:
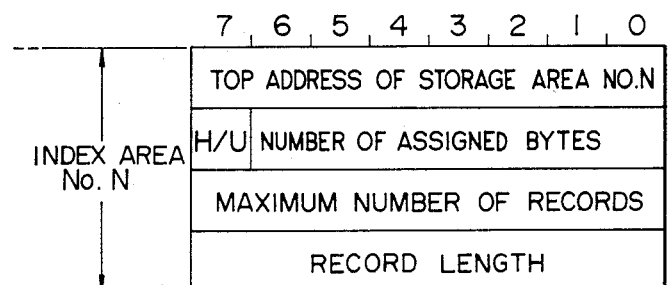
FIG. 8 shows the structure of the index area.

FIG. 8 shows the structure of one (No. N) of the index areas shown in FIG. 7 in more detail. The index area includes: an eight-bit area for storing the start address of the storage area No. N or the top address thereof in an ordinary case; an area for storing "a record length" of the storage area No. N in units of byte; an H/U bit of one bit configuration in which "0" is allocated for updated information and "1" is allocated for history information; an area for storing "a maximum number of records" representative of the number of records allocated to the storage area No. N; and an area for storing "the number of assigned bytes" to the flag bits located at the top address portion of the sotrage area No. N.

In the embodiment shown in FIG. 7, an index area corresponding to information to be read is first read. In case where the corresponding "H/U" bit indicates the updated information, the flag bits of the corresponding storage area are read in accordance with the top address stored in the index area. A record sotring the updated information is then directly accessed from the count of the flag bits. On the other hand, in case where the corresponding "H/U" bit indicates the history information, the readout start and end records in the storage area to be read are identified to sequentially read the identified information in the order of history. In this case, if there are records not permitted to be read, these records are passed without performing a readout.

Figure 9:
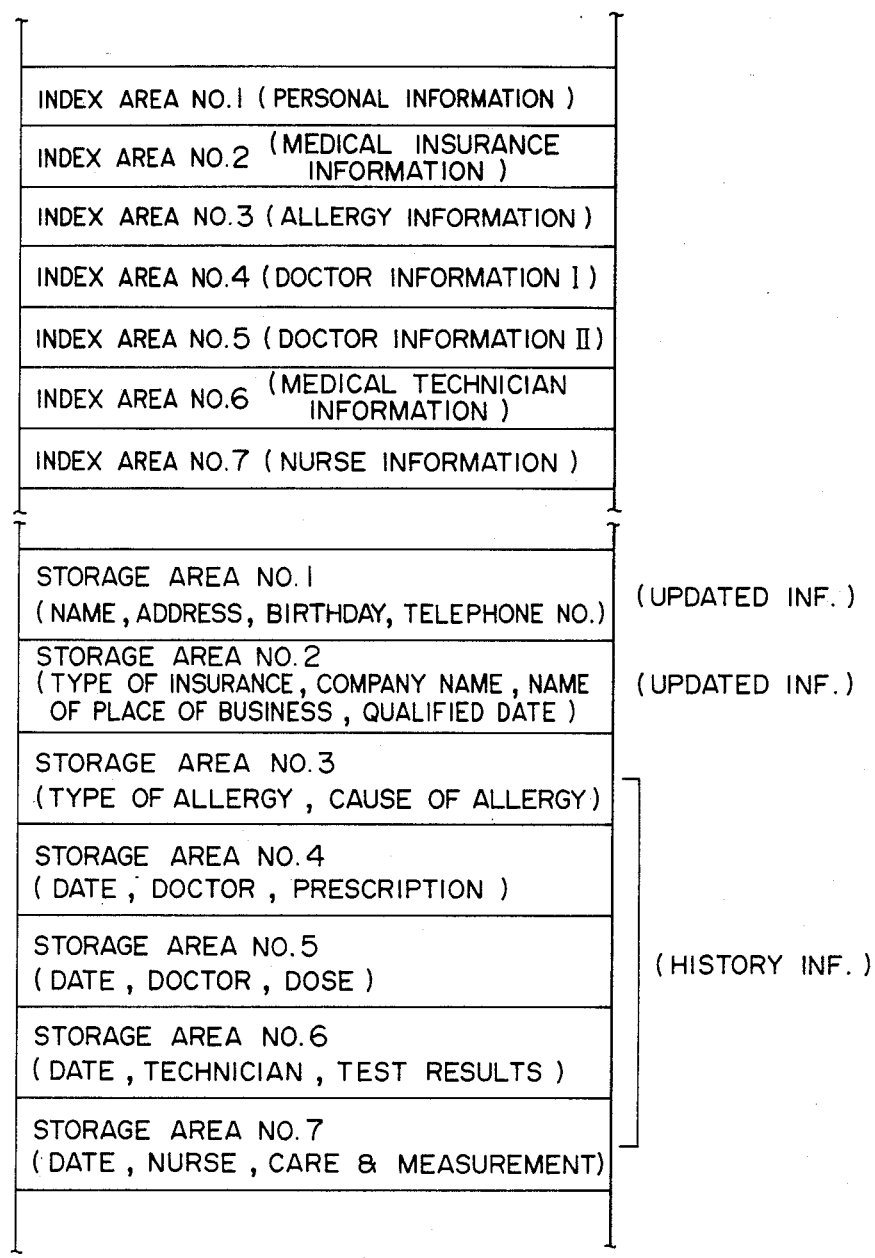
FIG. 9 shows an example of the structure of the memory.

A case where the IC card of the present invention is applied to use in medical facilities will be described with reference to FIG. 9. Assuming now that information used in medical facilities is grouped in 7 items such as personal information, medical insurance information and so on. In this example, personal information is indexed by the index area No. 1 and the content thereof is stored in the storage area No. 1. The personal information includes, for example name, address, birthday and telephone number, which are not generally renewed except the telephone number. Therefore, reading only the latest information can suffice so that the personal information can be considered as belonging to the category of the updated information as noted at the outside right of the storage area No. 1. The medical insurance information noted in the storage area No. 2 and including the types of insurance, company name, name of a place of business, date of qualification can generally suffice if only the latest information is obtained therefrom. Therefore, the medical insurance information can be considered as the updated information.

Allergy information noted in the storage area No. 3 and including the types and causes of allergy can be considered as the history information since the allergy information or past information can be used as a reference information for medical diagnosis. Other information, i.e., doctor information I and II, medical technician information and nurse information can be considered as the history information. However, in these cases, to maintain the medical management and patients in privacy, only the information necessary for the doctor or nurse handling the medical case concerned is made accessible limiting the readout content to a predetermined range.

Other applications of the invention may be bank deposit management, stock information and the like.

Figure 10:
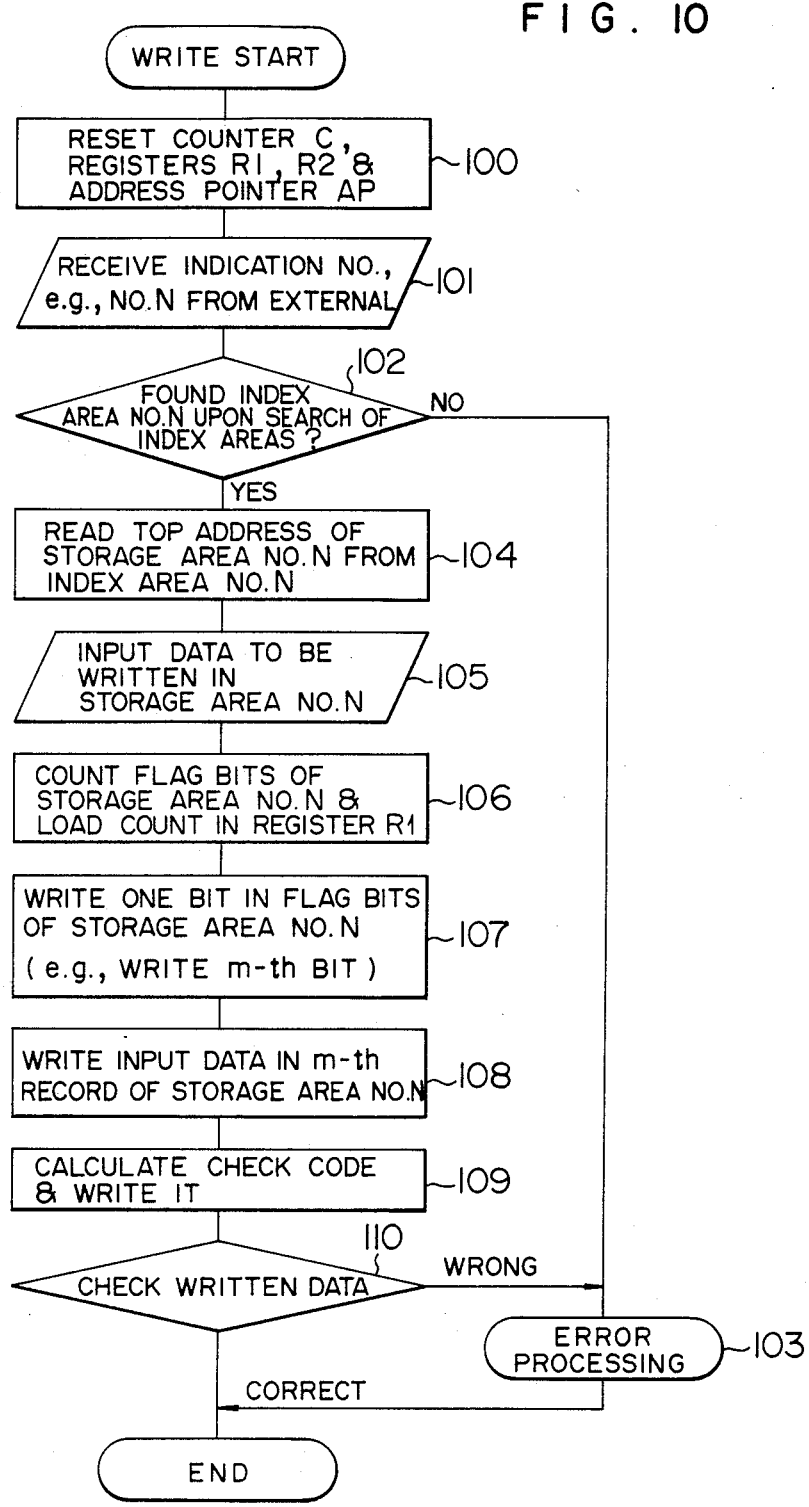
FIG. 10 is a flow chart showing the information write operation according to the present invention.

Next, the information write procedure will be described with reference to the flow chart of FIG. 10.

First, at step 100 a counter C, registers R1, R2 and an address pointer AP (respectively contained in the CPU 401) are reset for initialization. Next, when the item number, e.g., No. N of the information required to be written is designated from the external, the item number is received at step 101 to search the index area No. N at step 102. If No. N is not found, an error processing is performed at step 103 and the item number is again designated. If found at step 102, the top address portion of the storage area No. N is read at step 104 based on the top address stored in the index area No. N. Succeedingly at step 105, data to be written in the storage area No. N is inputted. At step 106, the number of flag bits inverted to "0" in the storage area No. N are counted. The count is then set to the register R1 in the CPU. At step 107, the bit next to the last inverted bit of the flag bits of the storage area No. N, e.g., the m-th bit is made inverted to thereafter write the inputted data in the m-th record of the storage area No. N. At step 109, check codes in conformity with the inputted data are calculated and they are written as the check byte. A test is carried out as to whether the written data is correct or not. If incorrect, step 103 follows to perform an error processing, while if correct, the write procedure is terminated. In other words, at step 110 the written data is compared with the information inputted at step 105 as to whether they are coincident, and if correct the write procedure is terminated, while if not correct, the error processing is performed at step 103.

Figure 11:
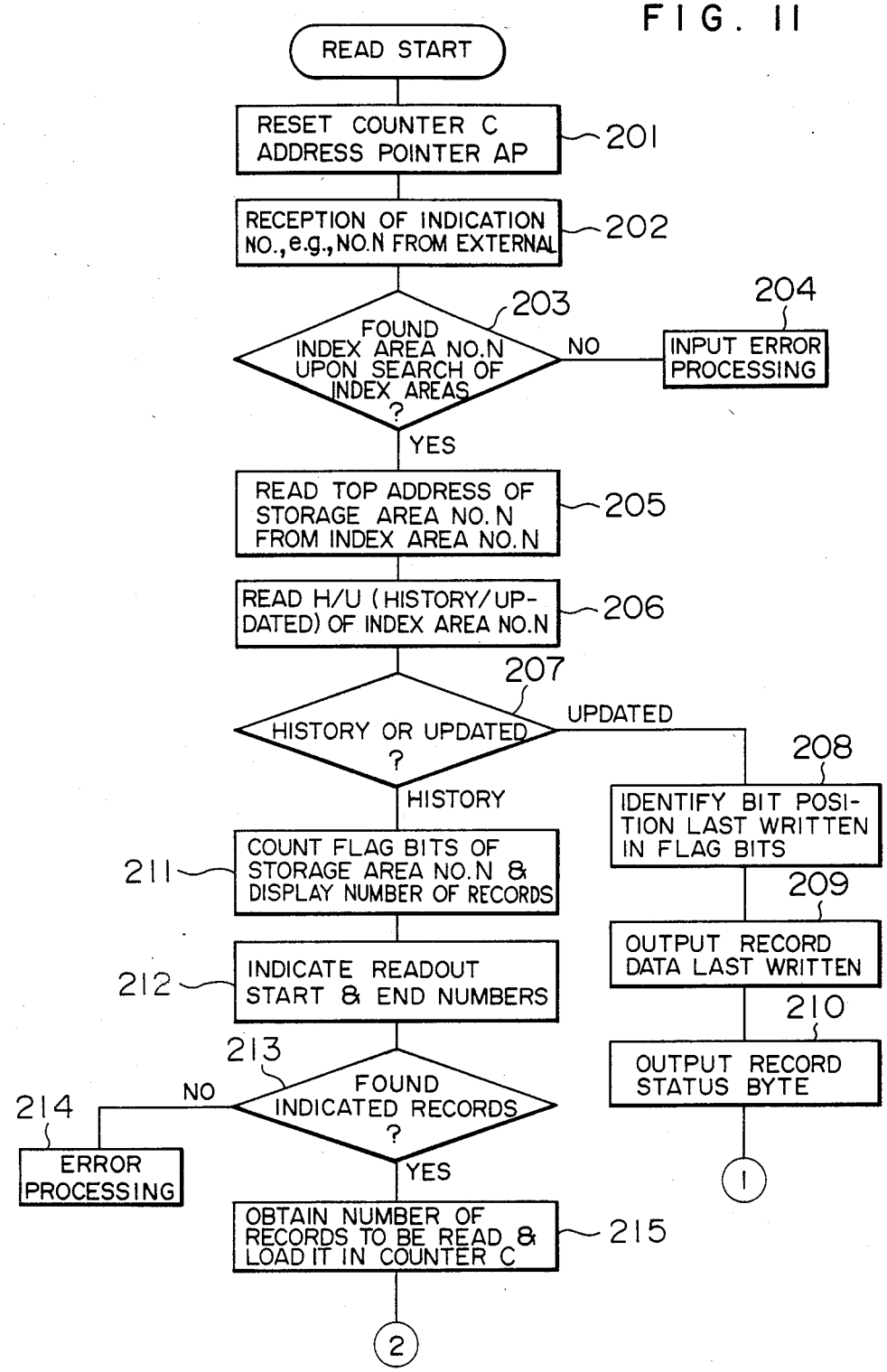
FIGS. 11 and 12 are flow charts showing a procedure for reading written information according to the present invention.
Figure 12:
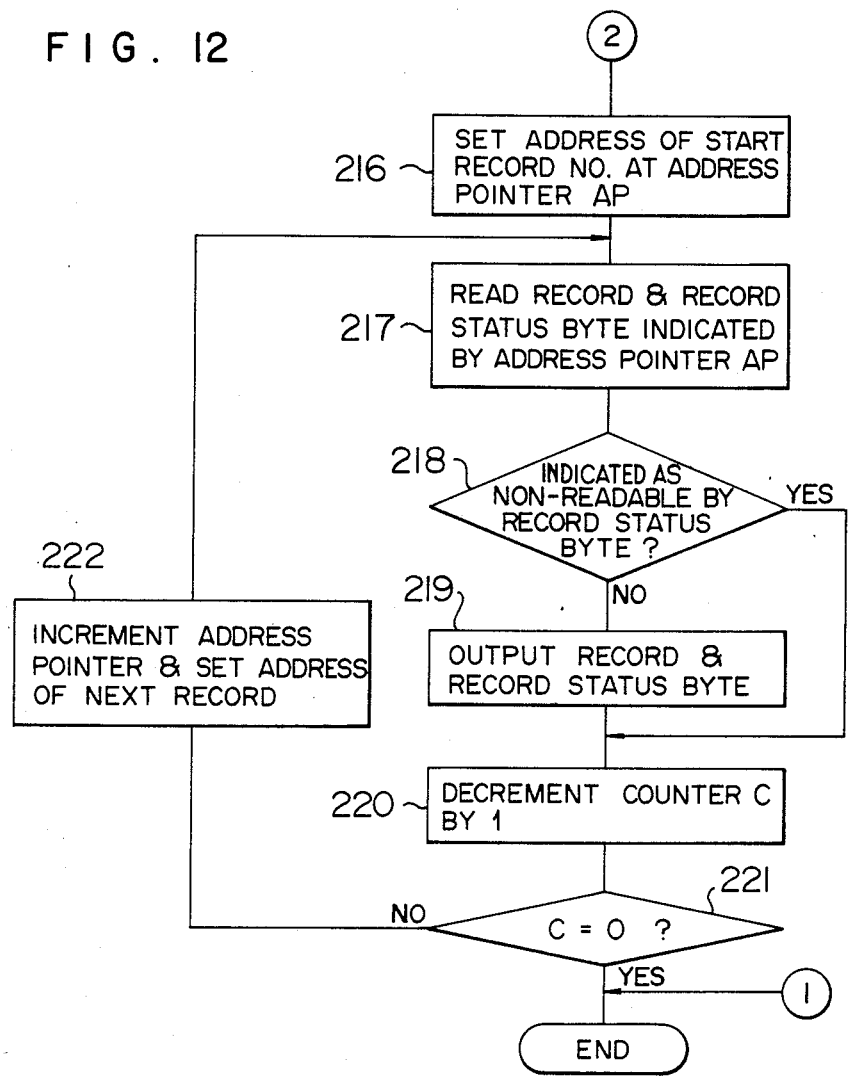

The readout of the information thus written in the IC card is carried out in accordance with the procedure shown in the flow charts of FIGS. 11 and 12. When the start of readout is initiated, first at step 201 the counter C and the address pointer AP are reset for initialization.

Next, at step 202 the number of the item to be read, which has been inputted from the external, e.g., No. N, is received. At step 203 the index area No. N is searched. If the index area No. N is not found, an error processing is performed at step 204. If found, the top address portion of the storage area No. N is read at step 205 based on the top address stored in the index area No. N. At step 206 the H/U bit of the index area No. N is read, and at step 207 it is judged if the readout is for history information or for updated information. In case of the updated information readout, at step 208 the position of the flag bit last written in the flag bit area is identified to access the record storing the latest information and output it at step 209. Then, at step 210 the record status byte is outputted at step 210 to confirm the presence or absence of erroneous information and the like before the readout is terminated. Alternately, if it is judged at step 207 as the history information readout, the number of records in which information has been written is counted from the flag bits of the storage area No. N and the number is outputted and displayed for confirmation purpose. Next, at step 212, the numbers of readout start and end records, No. n and No. m, are designated. In an ordinary case of the history information readout, the sequential readout starting from the first (No. 1) record to the latest record is carried out. However, depending upon the usage of the information, a sequential readout starting from a desired record No. n to a desired record No. m or to the latest record may be carried out. Next, at step 213 it is checked if there exist the desingated records. If not present, an error processing is performed at step 214. While if present, the number of records to be read is obtained at step 215. Particularly, this number is obtained by counting the number of bits having inverted "0s" among those starting from the n-th bit to the m-th bit in the flag bits of the storage area No. N. The count is loaded in the counter C. Next, the address of the start record No. n is set to the address pointer AP at step 216. Then, at step 217, the record and the record status byte designated by the address pointer AP are read. The read-out information is not outputted externally of the IC card but temporarily stored in RAMs or the like in the IC card. Next, it is checked if any status bit representative of disabling a readout is contained in the record status byte. If there is no such bit, the information temporarily stored in the IC card is outputted to the external at step 219. On the other hand, if there is such a bit, step 219 is bypassed and the information in the record is never outputted. At step 220, the value loaded in the counter C is decremented by 1 and checked if the resultant count is 0 (the informatin in the designated records is all read out) or not. If the count is 0, the readout is terminated. If not, at step 222 the set value of the address pointer AP is incremented by 1 to return to step 217 for repeating the similar procedure as above.

There is a case where the history information portion or only the updated portion of the same information is desired to be read. Assume that such information is indexed by the index area No. 3 of FIG. 6 for example and read from the storage area No. 3, that the H/U bit of the index area No. 3 is set at "0" for indicating that the information is an updated information, and that the information in the storage area No. N is desired to be read as a history information. In this case, another index area No. 3' other than the index area No. 3 is additionally provided such that the H/U bit of the other index area No. 3' is stored with "1" and the remaining portion thereof is stored with the same contents as of No. 3. With this construction, it is possible to perform an updated information readout from the storage area No. N through indication of the index area No. 3, and a history information readout through the index area No. 3'.

Figure 13:
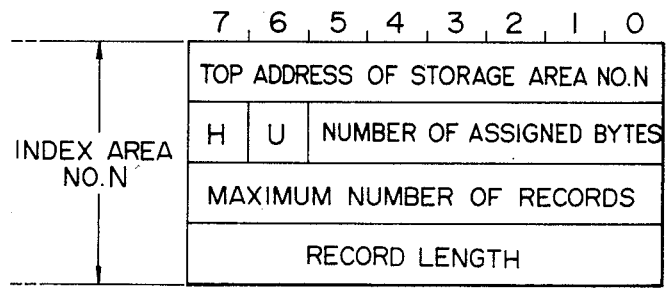
FIG. 13 shows the structure of the index area according to another embodiment of the invention.

FIG. 13 shows the structure of the index area according to another embodiment of the present invention, wherein both updated information readout and history information readout for the same information can be attained. In this embodiment, a history information readout bit H and an updated information readout bit U are each provided in the index area. Initially the two bits are set at "1", respectively. In case of the history information readout, only the bit H is inverted to "0", while in case of the updated information readout, only the bit U is inverted to "0". In case of both history and updated information readout, the two bits H and U are both inverted to "0".

The information read procedure for the embodiment shown in FIG. 13 will now be described. The procedure is basically similar to the procedure described with FIGS. 11 and 12 so that only the different contents thereof are described to avoid reiterative description.

In the flow chart of FIG. 11, after the top address of the storage area is read from the index area at step 205, a history information readout or an updated information readout is indicated. It is then judged if the indicated readout is represented by the bit H or the bit U. If not, an input error processing is performed. If affirmative, after confirming that the indicated readout is either for the history information or for the updated information, step 211 or 208 follows respectively.

Figure 14:
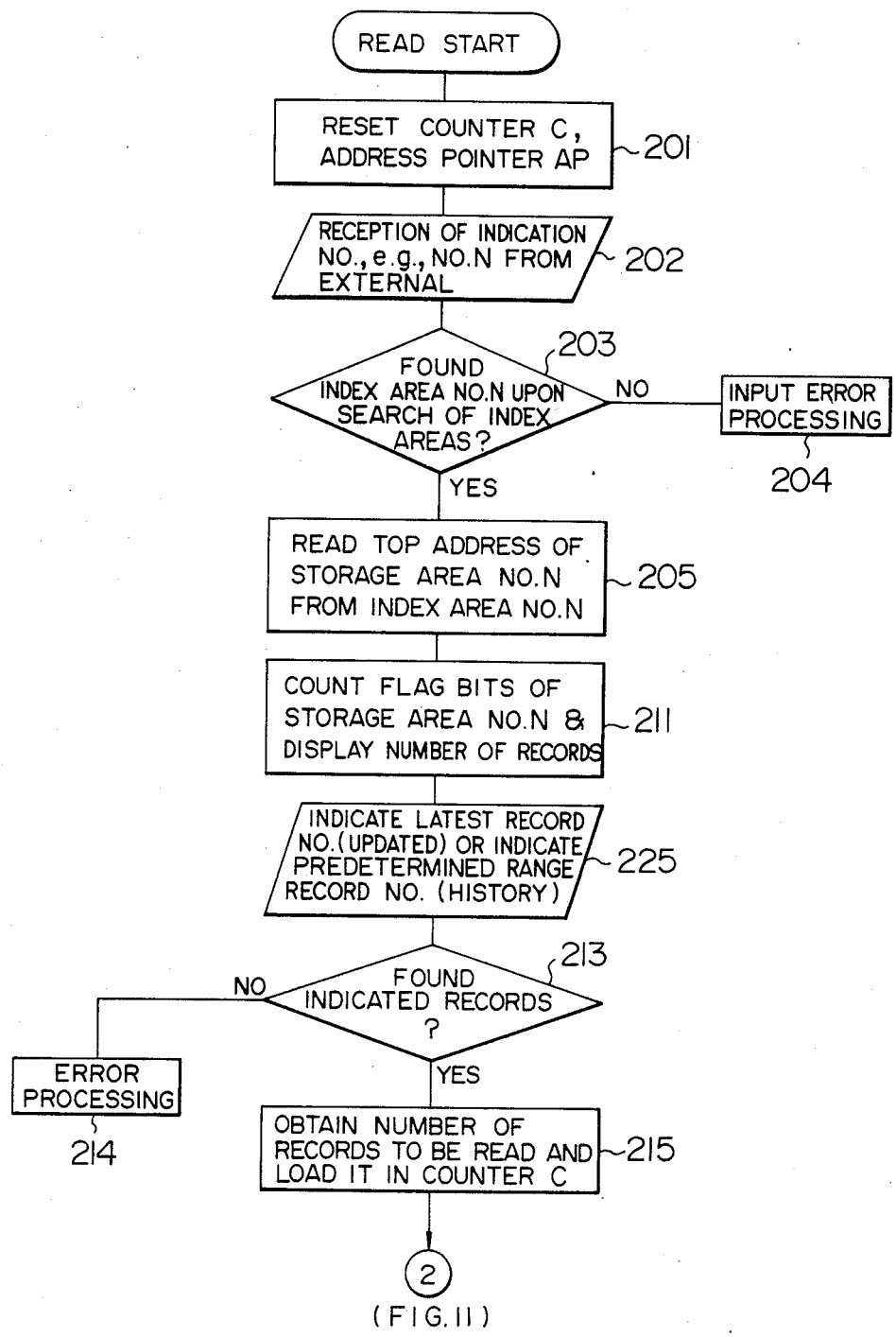
FIGS. 14 and 15 are flow charts showing a procedure for reading written information according to another embodiment of the invention.

According to another embodiments, the updated information and the history information can be selectively indicated without providing the designation bits such as H and U bits in the storage area by externally commanding to read out the latest information or commanding to read out a designated range of the records at each time reading is commanded. This selective operation is performed, for example, in accordance with the flow chart of FIG. 14. The steps up to step 205 of FIG. 14 is the same as of FIG. 11 so that the description therefor is omitted. At step 211, the number of written records is obtained by counting the flag bits in the storage area No. N and displayed. At step 225, considering the displayed record number, the record number of the latest information is appointed both as the readout start and end numbers to read only the latest information. Alternatively, in case of the history information readout, the readout start and end numbers are respectively appointed to sequentially read the history information. Obviously, if the readout start number is designated as 1 and the end number as that of the record last written, all of the records (except those unable to read) in the storage area are read sequentially in the order of history. The steps following step 213 in FIG. 14 are the same as those in FIG. 12 so that the description therefor is omitted.

Figure 15:
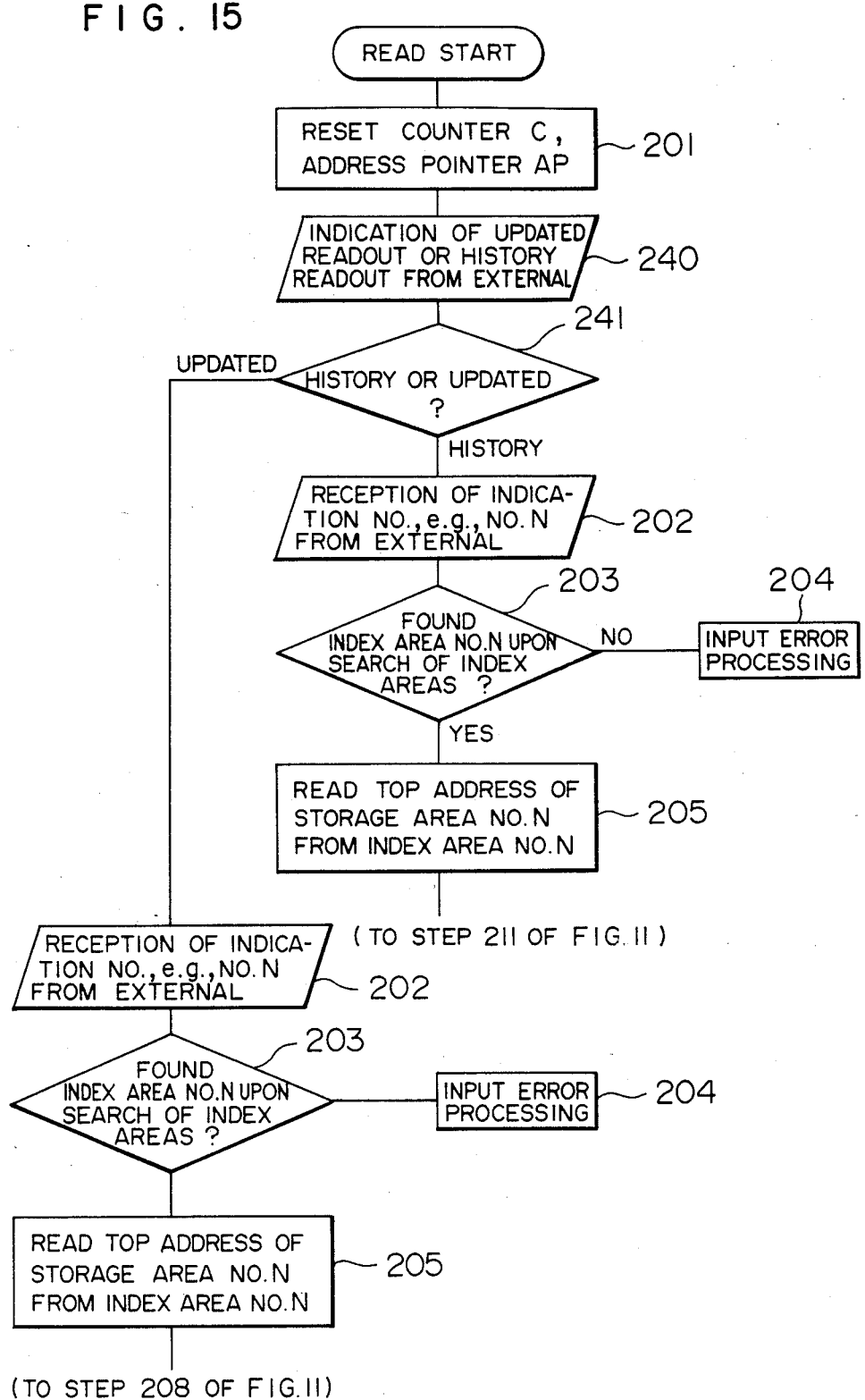

A still further embodiment will be described wherein although the H and U bits are not provided in the storage area, the updated or history information readout can substantially be selected. Particularly, in the procedure of FIG. 15, next to step 201, there is provided step 240 where an updated information readout or a history information readout is indicated from the external. Further, at step 241, it is judged if the indicated one is the updated information readout or the history information readout. In both cases, the storage area No. N is accessed at steps 202 to 205. Thereafter, step 208 of FIG. 11 follows in case of the updated information readout, or step 211 of FIG. 11 follows in case of the history information readout.

In the above two embodiments, the H and U bits are not provided in the storage area but the updated information readout and the history information readout are selectively designated to thereby attain similar advantageous effects to those of the embodiments of FIGS. 12 and 14.

I claim:

1. An IC card containing an electronic circuit including at least a CPU and memory means in which a plurality of storage areas are allocated, wherein information can be written sequentially in said memory means and said information can be read from said memory means, comprising:

means for receiving an external indicator at the IC card;

means for generating a signal at the IC card in response to the external indicator;

means for selectively indicating in response to said signal that information recorded in a plurality of storage areas of the memory means is either updated information or history information;

means for reading updated information, including only information recently stored in said storage areas, when said indicating means indicates that the information written in said storage areas is updated information; and means for reading history information, including the information stored in said storage areas, in a predetermined sequential order when said indicating means indicates that the information written in said storage areas is history information.

2. An IC card according to claim 1, wherein said indicating means includes an information bit to discriminate between information in said storage areas that is updated information as opposed to history information.

3. An IC card according to claim 2, wherein said indicating means includes means for judging, when information is read, whether said storage area is read as updated information or as history information based on said information bit.

4. An IC card according to claim 3, wherein said memory means has a plurality of index areas corresponding to said storage areas, said information bit being allocated in said index area.

5. An IC card according to claim 2, wherein said memory means has a plurality of index areas corresponding to said storage areas, said information bit being allocated in said index area.

6. An IC card according to claim 5, wherein each storage area comprises two index areas, one index area having a bit representative of a history information readout and the other index area having a bit representative of an updated information readout.

7. An IC card according to claim 5, wherein said index area has a first bit having information indicative of history information and a second bit having information indicative of updated information, and said means for reading the history information and the means for reading the updated information comprises means for selecting one of said first and second bits.

8. An IC card according to claim 7, wherein, when a desired range of said unit record areas to be read is indicated, said history information reading means reads only the information in the unit record areas within said range.

9. An IC card according to claim 1, further comprising means for readout discrimination, including disabling means for making predetermined information in said storge area unreadable to said history information reading means.

10. An IC card according to claim 9, wherein each of said storage areas of said memory means comprises a plurality of unit record areas for having information written therein, said unit record areas having said readout discrimination means associated therewith.

11. An IC card according to claim 1, 2, 3, 4, 5, 6, 7, 9, 10 or 8, wherein each of said storage areas have a flag bit that is written every time information is written in a corresponding unit record areas, said flat bit indicating that said information has been written in each of said unit record areas, and readout means for accessing said unit record area in which the latest information has been written most recently as determined from said flag bit.

* * * * *